(12) United States Patent
Pinckney et al.

(10) Patent No.: US 7,875,565 B1
(45) Date of Patent: Jan. 25, 2011

(54) TRANSPARENT GLASS-CERAMIC ARMOR

(75) Inventors: Linda Ruth Pinckney, Corning, NY (US); Jian-Zhi Jay Zhang, Ithaca, NY (US); Carl Franklin Cline, Danville, CA (US)

(73) Assignee: Corning Incorporated, Corning, NY (US)

(*) Notice: Subject to any disclaimer, the term of this patent is extended or adjusted under 35 U.S.C. 154(b) by 921 days.

(21) Appl. No.: 11/710,145

(22) Filed: Feb. 23, 2007

Related U.S. Application Data

(60) Provisional application No. 60/810,222, filed on May 31, 2006.

(51) Int. Cl.
  *C03C 10/14* (2006.01)
  *C03C 10/02* (2006.01)
  *C03C 10/04* (2006.01)
(52) U.S. Cl. .............. 501/4; 501/5; 501/7; 501/10; 89/36.02
(58) Field of Classification Search ............ 501/4, 501/7; 89/36.02
See application file for complete search history.

(56) References Cited

U.S. PATENT DOCUMENTS

| | | | |
|---|---|---|---|
| 3,828,699 A | 8/1974 | Bowen | 109/80 |
| 4,473,653 A | 9/1984 | Rudoi | |
| 4,719,151 A | 1/1988 | Chyung et al. | 428/428 |

(Continued)

FOREIGN PATENT DOCUMENTS

EP  0322719  12/1988

(Continued)

OTHER PUBLICATIONS

"*The behaviour of a $Sio_2$-$Li_2O$ glass ceramic during one-dimensional shock loading*," J. C. F. Millett, Journal of Physics D: Applied Physics 38 (2005) 3530-3536.

(Continued)

*Primary Examiner*—Karl E Group
(74) *Attorney, Agent, or Firm*—Walter M. Douglas

(57) ABSTRACT

The invention is directed to transparent glass-ceramic materials for use in transparent armor systems. Applications include armor systems for ground vehicles and aircraft as well as personal protective equipment. The glass-ceramic materials according to the invention exhibit a ballistic limit vs. areal density line slope of 1.0 or greater, preferably 1.1 or greater and more preferably 1.2 or greater. The crystalline phase of the glass ceramic materials may include β-quartz, spinel, spinel solid solutions, mullite and phases known in the art to be transparent.

3 Claims, 1 Drawing Sheet

U.S. PATENT DOCUMENTS

| | | | | |
|---|---|---|---|---|
| 5,045,371 | A | 9/1991 | Calkins | 428/76 |
| 5,060,553 | A * | 10/1991 | Jones | 89/36.02 |
| 5,070,045 | A | 12/1991 | Comte et al. | 501/4 |
| 5,496,640 | A | 3/1996 | Bolton et al. | 428/421 |
| 5,968,857 | A | 10/1999 | Pinckney | 501/10 |
| 5,996,115 | A * | 12/1999 | Mazelsky | 2/2.5 |
| 6,531,420 | B1 | 3/2003 | Beall et al. | 501/5 |
| 6,599,606 | B1 * | 7/2003 | Zou | 428/64.2 |
| 6,632,758 | B2 | 10/2003 | Beall et al. | 501/10 |
| 6,677,046 | B2 * | 1/2004 | Hachitani et al. | 428/426 |
| 7,001,861 | B2 | 2/2006 | Beall et al. | 501/128 |
| 7,220,690 | B2 * | 5/2007 | Mitra et al. | 501/4 |
| 2005/0119104 | A1 | 6/2005 | Alexander et al. | 501/14 |
| 2005/0143247 | A1 | 6/2005 | Siebers et al. | |
| 2008/0248707 | A1 * | 10/2008 | Liebald et al. | 442/181 |
| 2010/0154622 | A1 * | 6/2010 | Zachau et al. | 89/36.02 |
| 2010/0263525 | A1 * | 10/2010 | Siebers et al. | 89/36.02 |

FOREIGN PATENT DOCUMENTS

| | | |
|---|---|---|
| GB | 2284655 | 6/1995 |
| GB | 2379659 * | 3/2003 |
| JP | 01308845 * | 12/1989 |
| WO | 03/022767 | 3/2003 |

OTHER PUBLICATIONS

Advanced Materials and Process Technology Newsletter, Fall 2000, vol. 4, No. 3.

"*Recommendations for Determining the Hardness of Armor Ceramics,*" J. J. Swab, Int. J. Appl. Ceram. Technol. 1[3] 219-25 (2004).

"*Proposed Fracture Theory of a Dispersion-Strengthened Glass Matrix,*" D. P. H. Hasselman, et al Journal of the American Ceramics Society, vol. 49, No. 2, pp. 68-72.

Pfaeder, Heinz; Schott Guide to Glass, London: Chapman and Hall, 1996, ISBN 0-412-71960-6, p. 79.

* cited by examiner

Figure
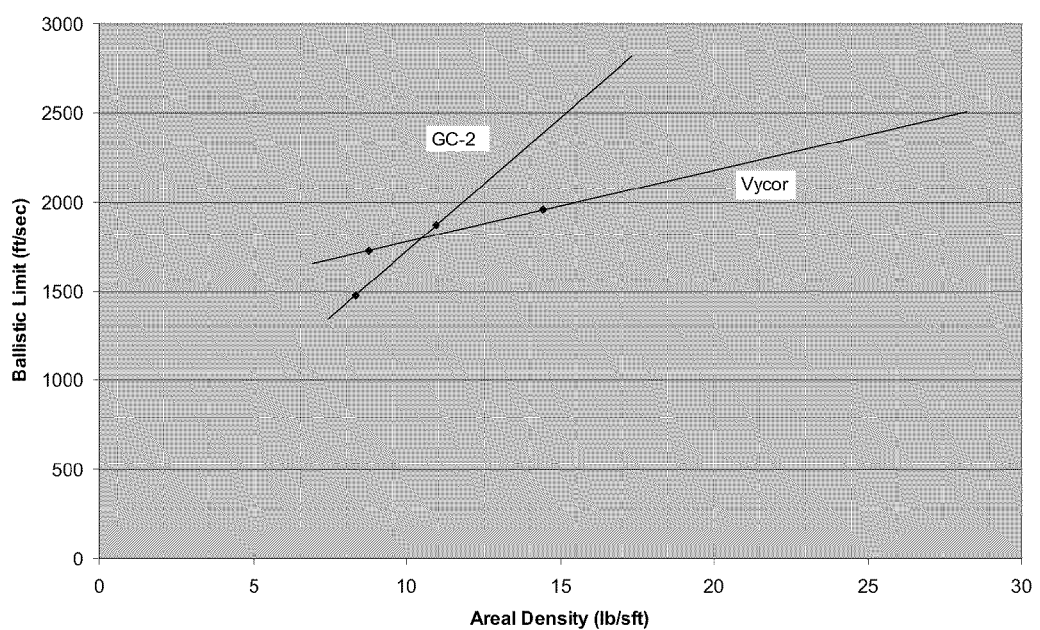

TRANSPARENT GLASS-CERAMIC ARMOR

PRIORITY

This application claims the priority of U.S. Provisional Application No. 60/810,222 filed May 31, 2006 and titled "TRANSPARENT GLASS-CERAMIC ARMOR."

GOVERNMENT INTEREST

Parts of this invention were made with United States Government support under Agreement No. HR0011-05-C-0127 awarded by DARPA. The United States Government may have certain rights in some of the claims of the invention.

FIELD OF THE INVENTION

The invention is directed to a transparent glass-ceramic armor that can be used for ballistic protection. In particular, the invention is directed to a glass-ceramic armor that provides ballistic protection while being transparent in both the visual and infrared (night vision) electromagnetic spectral ranges.

BACKGROUND OF THE INVENTION

Transparent armor is a material that is designed to provide ballistic protection while remaining optically transparent. This type of material can be used in combat and non-combat situations (e.g. riot control) for windows (both vehicles and buildings), protective visors, and protective covers for equipment such as sensing devices among other uses. While there may be specific requirements for each particular use, there are requirements that are common to most systems or devices. Specifically, the primary requirement for a transparent armor is that it not only defeat a specific threat, but that it also have the ability to receive multiple hits without distorting vision in the area surrounding the hit. Additional requirements, which may have to be optimized, depend on the particular use. These addition requirements include weight, space efficiency and cost-versus-performance. While many problems with transparent armor can be cured by increasing the thickness of the armor, this solution is not desirable because this increases the weight that has to be carried by a person or vehicle, increases distortion and thus reduces transparency due to the thickness of the material, and, in vehicles, is impractical due to space limitations.

Transparent materials that are used for ballistic protection (transparent armor) include:

(a) Polymeric materials, the most common being polycarbonate. This is an inexpensive material that can easily be fabricated and offers very good protection against small fragments. It is generally used for goggles, visors, face shields and eye "glasses". Other plastics such as transparent nylons, acrylates and polyurethanes have also been investigated, but their durability (e.g. to ultraviolet radiation) and optical properties limit their applications.

(b) Conventional glasses, such as soda lime and borosilicate glass, typically manufactured using the float process. These materials are low-cost, but increased requirements for lower weight, improved optical properties and ballistic performance have generated the need for improved materials.

(c) Crystalline materials such as aluminum oxynitride (AlON), single crystal aluminum oxide (Sapphire) and spinel ($MgAl_2O_4$) are the major materials presently being considered.

(d) Glass-ceramic Materials (i) One glass-ceramic material is TransArm™, a lithium disilicate glass-ceramic from Alstom UK Ltd. Due to its superior weight efficiency against ball rounds and small fragments, TransArm has the potential to increase performance of protective devices such as face shields used for explosive ordnance disposal. Studies of the shock behavior of these materials have shown that the glass-ceramic has a high post-failure strength compared to that of amorphous glasses.

(ii) U.S. Pat. No. 5,060,553 (Jones, 1991) describes armor material based on glass-ceramic bonded to an energy-absorbing, fiber-containing backing layer. Glass compositions listed in the patent that could be used to produce glass-ceramic materials include lithium zinc silicates, lithium aluminosilicates, lithium zinc aluminosilicates, lithium magnesium silicates, lithium magnesium aluminosilicates, magnesium aluminosilicates, calcium magnesium aluminosilicates, magnesium zinc silicates, calcium magnesium zinc silicates, zinc aluminosilicate systems calcium phosphates, calcium silicophosphates and barium silicate. While the transparency of the resulting glass-ceramic compositions was not specified, the use of a fiber-filled backing layer is likely to render these composites opaque.

(iii) U.S. Pat. No. 5,496,640 (Bolton and Smith, 1996) describes fire- and impact-resistant transparent laminates comprising parallel sheets of glass-ceramic and polymer, with intended use for security or armor glass capable of withstanding high heat and direct flames. Materials listed in the patent include commercial plate glass, float or sheet glass compositions, annealed glass, tempered glass, chemically strengthened glass, PYREX® glass, borosilicate glasses, lithium containing glasses, PYROCERAM, lithium containing ceramics, nucleated ceramics and a variety of polymer materials.

In addition to the materials mentioned above, additional materials and methods have also been investigated for ballistic protection. U.S. Pat. No. 5,045,371 (Calkins, 1991) describes a glass composite armor having a soda-lime glass matrix with particles of a pre-formed ceramic material dispersed throughout the material. The ceramic material was thus not grown in situ as is the case with glass-ceramics. U.S. Patent Application No. 2005/0119104 A1 (Alexander et al) describes an opaque, not transparent, armor based on anorthite [$CaAl_2Si_2O_8$] glass-ceramics.

While the materials and method described above have afforded ballistic protection, improvements in the area of transparent armor material systems are sorely needed. As the AMPTIAC Newsletter, Fall 2000, has stated: "Future warfighter environments will require lightweight, threat adjustable, multifunctional and affordable armor, which the current glass/polycarbonate technologies are not expected to met." The present invention is specifically directed to new low-cost, threat-effective material system transparent armor systems that will met these requirements.

SUMMARY OF THE INVENTION

In one aspect the present invention is directed to glass-ceramic materials for use as a transparent armor material. The glass-ceramic materials of the invention have a ballistic limit vs. areal density line slope of 1.0 or greater, preferably of 1.1 or greater and more preferably of 1.2 or greater. Any glass-ceramic material that meets the foregoing specification can be used in an armor system. Without limiting the invention, examples of such materials are glass-ceramic in which the crystalline phase is β-quartz, spinel, β-willemite, spinel solid solutions, mullite, and similar glass-ceramics known in the art. In a preferred embodiment of the invention the glass-ceramic material has a crystallite size of 30 nm or less. Generally, 90% or greater of the crystallites present in the glass-ceramics have a size of 30 nm or less.

In another aspect the invention is directed to a glass-ceramic material having a ballistic limit vs. areal density line slope of 1.2 of greater.

In further embodiment the invention is directed to a composite armor system wherein a glass-ceramic element constitutes at least one component, said glass-ceramic material having crystallites of size 30 nm or less and a ballistic limit vs. areal density line slope of 1.0 of greater. In another embodiment the glass-ceramic is a spinel or spinel solid solution in which the crystallites have a size of 30 nm or less and the percentage of spinel crystallites in the glass-ceramic is 35% or less. In yet a further embodiment the glass-ceramic is a β-quartz glass-ceramic in which the crystallites have a size of 30 nm or less and the percentage of β-quartz crystallites in the glass-ceramic is 30% or greater. In a preferred β-quartz embodiment the percentage is 50% or greater, and in a more preferred embodiment the percentage of 85% or greater. For spinel, spinel solid solution and β-quartz glass-ceramics, 90% or greater of the crystallites present in the glass-ceramics have a size of 30 nm or less. Other components of the composite armor system can be selected from transparent materials including polymers, polycarbonates, nylons, acrylates, additional glass-ceramic compositions, polycrystalline or single crystal materials, glasses such as soda-lime and borosilicate glasses, and other transparent materials as described herein and in the patent and literature references cited herein, and known in the art to be useful in transparent armor systems.

BRIEF DESCRIPTION OF THE DRAWINGS

The FIGURE is a graph of ballistic limit vs. a real density illustrating the superior projectile stopping ability of a representative glass-ceramic material compared to a silicate glass material.

DETAILED DESCRIPTION OF THE INVENTION

As used herein, the phrase "a ballistic limit vs. areal density line slope refers to a plot exemplified by FIG. 1 in which the ballistic limit $V_{50}$ in units of feet per second and the areal density is units of pounds per square foot, and the phrase is meant to include any similar plots of ballistic limit verses areal density regardless of the unit system that is used. The term $V_{50}$ signifies the projectile velocity at which there is a 50% probability of target penetration by the projectile. Glass-ceramic materials that are useful according to the invention for transparent armor applications have a slope that is greater than the normalized slope of the reference material (that is, the standard for all comparative measurements) of FIG. 1 which is Vycor® brand glass. The slope of the Vycor glass is assigned a normalized value of 1.0 and all glass-ceramic materials useful according to the invention will have a slope that is greater than 1.0. For example without limitation, relative to the normalized Vycor slope of 1.0, the glass-ceramics useful for transparent armor applications according to the invention have a slope of 1.1 or greater, 1.2 or greater, etc. As used herein, the phrase "have a slope greater than 1.0" or "having a ballistic limit vs. areal density line slope greater than 1.0", and similar phrases, refers to the foregoing. All crystallinity percentages herein are in volume percent (V. %). All composition percentages are in weight percent (wt. %).

Glass-ceramics are microcrystalline solids produced by the controlled devitrification of glass. Glasses are melted, fabricated to shape, and then converted by heat treatment to a predominantly crystalline ceramic using methods described in the art, for example, U.S. Pat. Nos. 5,070,045, 6,531,420, 6,632,758, 6,936,444 and 7,001,861 (all assigned to Corning Incorporated). The basis of controlled crystallization lies in efficient internal nucleation, which allows development of fine, randomly oriented grains without voids, micro-cracks, or other porosity. Like both glass and ceramics, glass-ceramics are brittle materials which exhibit elastic behavior up to the strain point that results in breakage. However, because of the nature of the crystalline microstructure, mechanical properties including strength, elasticity, fracture toughness, and abrasion resistance are higher in glass-ceramics than in glass. The presence of uniformly distributed crystals throughout a glass-ceramic causes deflection and blunting of cracks, thereby providing enhanced resistance to fracture propagation.

As transparent armor systems are required to meet ever more stringent ballistic requirements while reducing weight and cost, traditional designs using conventional glass sheets laminated with polymer materials have become unacceptable. In particular, in order to increase ballistic performance more glass has to be added and the overall armor weight has become unbearable for the user or vehicle. As a result, there is consensus among those developing and using transparent armor that the fundamental solution lies in innovative materials and not more of the same glass. The present invention is based in the discovery that transparent materials having a ballistic limit vs. areal density line slope greater than 1.0 are particularly suitable for use in transparent armor systems.

The present invention relates to the use of transparent glass-ceramics for various armor systems. Applications may include armor systems for ground vehicles and aircraft as well as for personal protective devices. The optical properties of these transparent glass-ceramic materials meet the visible transparency as well as the near IR (infrared) transparency requirements for most military armor systems. Examples of the materials that can be used in armor systems of the invention include those glass-ceramics meeting the ballistic limit vs. areal velocity ("BLvAD") criterion described herein. Such glass-ceramic include, without limitation, those in which the crystalline phase is β-quartz, spinel, β-willemite, forsterite, spinel solid solutions, mullite, and similar glass-ceramics known in the art that are transparent. The low density of these materials combined with a higher ballistic limit offers either or both of two important attributes. The first attribute is the ability of the materials to achieve ballistics performance equivalent to that of glass with a lower material thickness, thereby providing critically-needed lower weight for armor systems. The second attribute is the ability of the materials, when used in laminate systems, to achieve superior ballistics performance with the same laminate thickness used for current transparent armor systems. By way of example, glass ceramics in which the crystalline phase is β-quartz, spinel or a spinel solid solution is the crystalline phase as exemplified in the Tables included herein.

It is generally recognized that a material's hardness and fracture toughness contributes to its ballistic performance, although the exact correlation is still elusive after decades of research (see J. J. Swab, *Recommendation for determining the Hardness of Armor Ceramics*, Int. J. Appl. Ceram. Technol. 1 [3] (2004), pages 219-225). For example without limitation, as a class of material, β-quartz glass-ceramics combine the manufacturability of glass with many property strengths of crystalline materials, and provide a broad design space for property optimization as well as a cost advantage for a broad range of applications. Furthermore, β-quartz glass-ceramics present an opportunity to develop materials that can be used in multiple applications (including non-military, non-law enforcement applications), thus presenting an economy of scale that can further drive down costs to benefit all applications, particularly the ones that by themselves do not have sufficient volume. Other glass-ceramic materials having different crystalline phases offer similar benefits. In the discussion that follows, although a glass-ceramic having β-quartz as the crystalline phase is used as the model, it is to be understood that other glass-ceramic materials having different crystalline phases, or even a combination of crystalline phases, can be used provided they met the BLvAD criterion.

In some transparent armor applications the β-quartz material by itself may be sufficient to afford ballistic protection. However, in a preferred system ballistic protective system using β-quartz or spinel glass-ceramics, one or more sheets of the glass-ceramic material are laminated into a composite layered structure with a polymer material as backing or "spall catcher". This is the same technique as used with conventional glass materials, but with a different, superior, innovative material, glass-ceramics such as a β-quartz glass-ceramic. The number of layers and the order of the layers in the composite structure may depend on the threat types the armor system is designed to defeat. In certain cases, it may be advantageous to include one or more polymer sheets in-between the glass-ceramic sheets for optimized performance. Other cases it may be desirable to use a material that is harder than the glass-ceramic as the strike surface to improve ballistic performance against more potent threats such as armor piercing bullets. Such a hard material may be a crystalline material such as aluminum oxynitride or spinel, or it could be a hard glass or even another glass-ceramic with higher hardness than the β-quartz glass-ceramic. The polymer sheets and interlayer adhesive materials may be chosen from materials in use in present day armor technology. Some of the considerations for selecting the polymer materials and adhesives include index of refraction matching with the glass-ceramic, chemical and mechanical compatibility with the glass-ceramics, ballistic performance, and environmental performance in the armor system in the range of potential use environments.

The glass-ceramic materials according to the invention offer significant advantages over conventional glass in resisting penetration of projectiles, including armor piercing (hard steel core) type projectiles. When ballistic limit (the ability to stop projectiles in units of ft/sec) is plotted against thickness or areal density (in units of lbs/sq ft), glass-ceramics show a much steeper slope as compared to glass. This indicates that stopping projectiles at a preset velocity (e.g., muzzle velocity for certain type of bullets) would require much less (in thickness or areal density) glass-ceramic material than conventional glass. This is illustrated in FIG. 1 with Vycor® brand glass being the conventional glass. Assuming similar mass densities, this translates into much lower weight for a glass-ceramic based armor solution in comparison to one based on conventional glass. As far as is known, the present inventors, and their assignee Corning Incorporated, are first and only entity to recognize this steep slope and its implications for transparent armor applications.

The glass-ceramic offers cost benefits over solely crystalline materials; that is, materials in which the only phase is a crystalline phase as opposed to multi-phase glass-ceramic materials, that typically have an amorphous phase and a crystalline phase. While crystalline materials have shown very good ballistic performance against a range of threats on a weight efficiency basis, they are not cost effective. For example, crystalline aluminum oxynitride, spinel and sapphire have all demonstrated weight efficiencies that are >3 times better than glass. This means that an armor system using these crystalline materials can stop the same projectiles with less than ⅓ the total weight of a glass-based system. However, transparent crystalline materials use very expensive powder processing (for aluminum oxynitride and spinel) or crystal growth (for sapphire) methods. These methods are intrinsically very expensive, have low product yields, and are not conducive to making large size sheets. In addition to manufacturing costs, the cost of finishing and polishing these crystalline materials is very high and typically adds an additional 40-100% to the overall materials costs. Making curved sheets that could be used for visors, vehicle windows, riot shields and similar equipment would add further complexity and cost. As a result, these high performance materials are not currently in use outside of research labs, and will be so for the foreseeable future. In contrast, transparent beta-quartz glass-ceramics have been manufactured for years in the form of flat rolled sheets and curved shapes, both of which can be utilized in the manufacture of transparent armor.

Using β-quartz as an exemplary material, any composition capable of forming glass-ceramic materials having 30% or greater β-quartz crystallites of 30 nm size or less can be used in accordance with the invention. By way of example only, one such composition having at least an 85% β-quartz crystallites of 30 nm size or less that was used for making transparent glass-ceramic armor contains, in weight percent (wt. %), 60-80% $SiO_2$, 15-30% $Al_2O_3$, and 1-5 wt % $Li_2O$. Optional components, also in weight percent, that can be present in the composition include up to 5% each of MgO, ZnO, BaO and SrO including mixtures thereof; up to 6% $TiO_2$, up to 1% $As_2O_3$; and up to 2% each of $Na_2O$ and K2O. By way of example only, a more specific example falling within the foregoing compositions is the following glass-ceramic composition shown in Table 1, all weight percents being ±10% of the given weight percent. This material may be cerammed according to U.S. Pat. No. 5,070,045. This composition corresponds to GC-2 in Table 2.

TABLE 1

| Component | Wt. % |
| --- | --- |
| $SiO_2$ | 65-70 |
| $Al_2O_3$ | 17-23 |
| $Li_2O$ | 2.5-4 |
| MgO | 0-3. |
| ZnO | 0-3 |
| $TiO_2$ | 2-4 |
| BaO | 0.5-2 |
| SrO | 0-.5 |
| $ZrO_2$ | 1-2 |
| $As_2O_3$ | 1 |
| $Sb_2O_3$ | 0 |
| $Na_2O$ | 0.2 |
| $K_2O$ | 0.2 |
| $V_2O_5$ | 0 |

Comparative physical properties for some transparent β-quartz and spinel glass-ceramics and one hard optical glass are shown in the following Table 2.

TABLE 2

| Material | Optical Glass | GC-1 | GC-2 | GC-4 |
|---|---|---|---|---|
| Crystal Phase | None | β-quartz s.s. | β-quartz s.s. | Spinel ZnAl$_2$O$_4$ |
| Density g/cm$^3$ | 4.1 | 2.55 | 2.55 | 2.75 |
| Hardness | KHN/2000 | KHN/200 | KHN/200 | KHN/200 |
| Mean(5) | 686 | 566 | 600 | 640 |
| Highest | 700 | 571 | | 649 |
| Young's Modulus GPa psi | 87* | 90 1.30 × 10$^7$ | 90 1.30 × 10$^7$ | 94.5 1.37 × 10$^7$ |
| Fracture Toughness MPam$^{-1/2}$ Mean (6) Highest | | 0.93 | 91 | |

| Material | GC-6 | GC-7 | GC-8 | GC-9 |
|---|---|---|---|---|
| Crystal Phase | Spinel ZnAl$_2$O$_4$ | Spinel s.s. (Zn, Mg) Al$_2$O$_4$ | Spinel s.s. (Zn, Mg) Al$_2$O$_4$ | Spinel s.s. (Zn, Mg) Al$_2$O$_4$ |
| Density g/cm$^3$ | 2.78 | 2.76 | 2.78 | 2.80 |
| Hardness | KHN/200 | KHN/200 | KHN/200 | KHN/200 |
| Mean(5) | 668 | 704 | 711 | 733 |
| Highest | 677 | 728 | 734 | 751 |
| Young's Modulus GPa psi | 91 1.32 × 10$^7$ | 94.5 1.37 × 10$^7$ | 100.7 1.46 × 10$^7$ | 103.5 1.50 × 10$^7$ |
| Fracture Toughness MPam$^{-1/2}$ Mean (6) Highest | | 0.814 0.822 | | |

*Young's modulus in 10$^3$ N/mm$^2$
KHN = Knoop Hardness
s.s. = solid solution

Additional examples, without limitation, of transparent spinel glass-ceramic compositions A-L that can be used in practicing the invention are shown in Table 3. Generally, the spinels have a composition, in weight percent (wt. %) of 40-70% SiO$_2$, 15-25% Al$_2$O$_3$, 7-20% ZnO, 0-6% MgO, 0-4% BaO, 0-2% CaO, 0-5% K$_2$O, 0-5% Na$_2$O, 1-8% TiO$_2$, 1-8% ZrO$_2$ and 0.5±0.3% As$_2$O$_5$. Alkali metal oxide can optionally be included to reduce color. A criterion for the transparent spinel glass-ceramic compositions is that they have a ballistic limit vs. areal density line slope of 1.0 or greater, preferably of 1.1 or greater and more preferably of 1.2 or greater

TABLE 3

| wt % | A | B | C | D | E | F |
|---|---|---|---|---|---|---|
| SiO$_2$ | 59.3 | 60.6 | 49.6 | 58.3 | 58.9 | 59.9 |
| Al$_2$O$_3$ | 19.1 | 19.1 | 22.6 | 20.2 | 19.1 | 19.2 |
| ZnO | 9.0 | 9.0 | 18.0 | 8.4 | 9.0 | 9.0 |
| MgO | 2.5 | 2.5 | | 4.2 | 2.5 | 2.5 |
| BaO | 2.1 | | | | 1.0 | 2.1 |
| CaO | | 0.8 | | | | |
| K$_2$O | | | 2.3 | | | |
| Na$_2$O | | | | | 1.5 | |
| TiO$_2$ | 5.0 | 5.0 | 1.9 | 3.0 | 5.0 | 0 |
| ZrO$_2$ | 3.0 | 3.0 | 5.7 | 5.0 | 3.0 | 7.3 |
| As$_2$O$_5$ | 0.5 | 0.5 | 0.5 | 0.5 | 0.5 | 0.5 |

TABLE 3-continued

| wt % | G | H | I | J | K | L |
|---|---|---|---|---|---|---|
| SiO$_2$ | 58.4 | 58.4 | 58.6 | 59 | 60 | 58.7 |
| Al$_2$O$_3$ | 19.1 | 19.1 | 19.1 | 19 | 18 | 19 |
| ZnO | 9.0 | 9.0 | 9.0 | 9 | 9 | 9 |
| MgO | 2.5 | 2.5 | 2.5 | 3 | 3 | 3 |
| BaO | 1.0 | 0 | 1.0 | 2 | 2 | 1.5 |
| CaO | 0 | 0 | 0 | 0 | 0 | 0.8 |
| K$_2$O | 2.0 | 0 | 1.0 | 0 | 0 | 0 |
| Na$_2$O | 0 | 2.0 | 0.75 | 0 | 0 | 0 |
| TiO$_2$ | 5.0 | 5.0 | 5.0 | 3.0 | 5.0 | 5.0 |
| ZrO$_2$ | 3.0 | 3.0 | 3.0 | 5.0 | 3.0 | 3.0 |
| As$_2$O$_5$ | 0.5 | 0.5 | 0.5 | 0.5 | 0.5 | 0.5 |

It should be understood that other composition yielding transparent spinel glass-ceramic materials after ceramming can also be used in accordance with the invention provided that they also have a ballistic limit vs. areal density line slope of 1.0 or greater, preferably of 1.1 or greater and more preferably of 1.2 or greater Despite considerable work over the years, the exact correlation of static material properties and ballistic performance is still elusive today. One hypothesis that has been offered is that an ideal armor material needs to have sufficient hardness to break up the projectile, but above a certain threshold value hardness no longer dictates performance. If optimization of other mechanical properties such as fracture toughness can be achieved while the hardness is above the threshold value, armor performance can be optimized as well. Glass-ceramics ideally offer this possibility.

Based on the above hypothesis and understanding, both experimental and commercial transparent glass-ceramics have been tested in various configurations. These include various spinel type glass-ceramics as exemplified by (GC-6); Corning glass code 9664 (GC-7) and variants of code 9664 with added alumina (GC-8 and GC-9). β-quartz glass-ceramics that were tested include a Corning patented β-quartz glass-ceramic (GC-2) and another commercially available glass-ceramic material (GC-1). Other materials that were tested include a hard optical glass and another spinel (GC-4). At two different thicknesses, GC-2 and Vycor glass backed by polycarbonate have produced an interesting phenomenon. The polycarbonate backed glass-ceramic materials have a high weight efficiency slope as shown in FIG. 1. This high slope, which based on results to date is believed will hold true and linear at thickness up to approximately 1 inch (2.54 cm), would predict that 1 inch thick GC-2 would be able to stop a 7.62 mm AP (anti-personnel) bullet at muzzle velocity of 2750 ft/sec. In contrast one would need over 2 inches (5.08 cm) of Vycor glass to stop the same bullet.

FIG. 1 is a graph of ballistic limit vs. areal density illustrating the superior projectile stopping ability of a representative glass-ceramic material compared to a glass material. (Both materials are backed by polycarbonate.) The slope of the slope of the line for ceramic material GC-2 is greater than the slope of the line for the Vycor® brand reference glass; that is greater than 1.0 Base on experimental results, 13-quartz glass-ceramic materials suitable for transparent armor application should have a crystallinity of 25 or greater and a ballistic limit vs. areal density line slope greater than 1.0, preferably a slope of 1.1 or greater. In a preferred embodiment the crystallinity is 50% or greater and the slope is 1.1 or greater. In another preferred β-quartz embodiment the crystallinity of 85% or greater. In further preferred embodiments of the foregoing the ballistic limit vs. areal density line slope of 1.2 or greater.

Limited ballistic testing so far suggests that an all-glass-ceramic laminate of 1 inch (2.54 cm)" should be able to perform the ballistic equivalent of 2-3 inches (approximately 5.1-7.6 cm) of conventional glass. All testing that was conducted on the all-transparency laminates discussed above used one-half inch (1.27 cm) polycarbonate as the spall catching layer, similar to the presently available armor systems.

As noted elsewhere herein, the exact correlation of static material properties and ballistic performance is poorly understood. One hypothesis is that an ideal armor material needs to have sufficient hardness to break up the projectile, but above a certain threshold value, hardness no longer dictates performance. For the spinel glass-ceramics, this hypothesis is supported by the moderate Knoop hardness values of 700-730 that are obtained with these materials. In addition, the microstructure of the spinel glass-ceramic itself—10-20 nm hard spinel nanoparticles dispersed uniformly throughout a continuous lower-expansion, "softer" glass phase—can provide enhanced ballistics protection. Hasselman and Fulrath, *Proposed fracture theory of a dispersion strengthened glass matrix*, J. Am. Ceram. Soc. 49, 68-72 (1966), proposed a fracture theory wherein hard spheroidal crystalline dispersions within a glass will limit the size of flaws which can be produced on the surface, thereby leading to an increase in strength. Such a crystalline microstructure may help to explain the higher observed slope with glass-ceramic vs. glass thickness.

In summary, glass-ceramic materials, for example, have shown good promise as a transparent armor material in laminated structures. Extrapolation of limited data predicts that an all-GC-2 laminate (backed by one-half inch polycarbonate) may result weight savings around 50% when compared to a laminate using conventional silicate glass. Glass-ceramics have also shown to be effective as a backing material for a hard glass strike surface, an additional embodiment potentially offering superior space efficiency.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

We claim:

1. A composite armor system wherein a glass-ceramic element or material constitutes at least one component, said glass-ceramic material having crystallites of size 30 nm or less and a ballistic limit vs. areal density line slope of 1.2 or greater;

wherein:

said glass-ceramic material is a β-quartz glass-ceramic having a crystallinity of 50 Vol. % or greater, and said glass-ceramic material has a composition comprising, in weight percent,

| Component | Wt. % |
|---|---|
| $SiO_2$ | 65-70 |
| $Al_2O_3$ | 17-23 |
| $Li_2O$ | 2.5-4 |
| MgO | 0-3. |
| ZnO | 0-3 |
| $TiO_2$ | 2-4 |
| BaO | 0.5-2 |
| SrO | 0-.5 |
| $ZrO_2$ | 1-2 |
| $As_2O_3$ | 1 |
| $Sb_2O_3$ | 0 |
| $Na_2O$ | 0.2 |
| $K_2O$ | 0.2 |
| $V_2O_5$ | 0 | all weight percents being ±10% of the given weight percent amount.

2. The composite armor system according to claim 1, wherein said glass-ceramic material has 90 Vol. % or greater of the crystallites present in the glass ceramic have a size of 30 nm or less.

3. The composite armor according to claim 1, wherein said glass-ceramic material is a β-quartz glass-ceramic having a crystallinity of 85 Vol. % or greater.

* * * * *